United States Patent [19]
Chase

[11] Patent Number: 5,630,654
[45] Date of Patent: May 20, 1997

[54] HEAT-RESISTANT OVERLAY FOR AN AUTOMOTIVE STEEL WHEEL

[75] Inventor: Lee A. Chase, Ada, Mich.

[73] Assignee: Lacks Industries, Inc., Grand Rapids, Mich.

[21] Appl. No.: 312,144

[22] Filed: Sep. 26, 1994

[51] Int. Cl.⁶ ........................................ B60B 7/06
[52] U.S. Cl. ........................ 301/37.43; 301/37.1
[58] Field of Search ..................... 301/37.1, 37.42, 301/37.43, 37.32, 37.33, 37.34, 37.35, 37.37, 5.22

[56] References Cited

U.S. PATENT DOCUMENTS

| | | |
|---|---|---|
| 3,669,501 | 6/1972 | Derleth . |
| 3,726,566 | 4/1973 | Beith ................................ 301/63.1 |
| 3,762,677 | 10/1973 | Adams . |
| 3,823,982 | 7/1974 | Spisak . |
| 3,891,276 | 6/1975 | Spisak . |
| 3,915,502 | 10/1975 | Connell . |
| 4,251,476 | 2/1981 | Smith . |
| 4,344,654 | 8/1982 | Apezynski ................... 301/37.42 X |
| 4,511,183 | 4/1985 | Spiegel et al. ................. 301/37.37 |
| 4,530,542 | 7/1985 | Spiegel et al. . |
| 4,563,042 | 1/1986 | Seitz et al. . |
| 4,572,584 | 2/1986 | Brown ........................ 301/37.42 X |
| 4,659,148 | 4/1987 | Grill . |
| 4,682,820 | 7/1987 | Stalter . |
| 4,861,538 | 8/1989 | Stalter, Sr. . |
| 4,900,097 | 2/1990 | Kostov et al. . |
| 4,976,497 | 12/1990 | Post et al. . |
| 4,985,303 | 1/1991 | Addeo et al. . |
| 5,031,966 | 7/1991 | Oakey . |
| 5,057,252 | 10/1991 | Kagawa et al. . |
| 5,059,106 | 10/1991 | Joseph . |
| 5,128,085 | 7/1992 | Post et al. . |
| 5,143,426 | 9/1992 | Todd . |
| 5,346,288 | 9/1994 | Hodge et al. ................. 301/37.42 X |

FOREIGN PATENT DOCUMENTS

| | | | |
|---|---|---|---|
| 2281698 | 3/1976 | France ............................ 301/37.43 |
| 2457907 | 9/1978 | Germany ........................ 301/37.43 |

*Primary Examiner*—Russell D. Stormer
*Attorney, Agent, or Firm*—VanOphem Meehan & VanOphem

[57] ABSTRACT

A method for providing a decorative surface on a standard steel wheel, without requiring the use of the wheel in the production of the decorative surface. The decorative surface of this invention is provided by an overlay composed of a panel which is assembled to the surface of the wheel and which closely conforms to certain portions of the wheel, while being spaced apart from other portions of the wheel in order to form exterior surface contours which contribute an aesthetically pleasing appearance to the wheel. The overlay further includes a spacing feature disposed on the inboard surface of the overlay. The spacing feature is configured to mate with portions of the axial surface of the wheel so as to fill voids between the inboard surface of the panel and the axial surface of the wheel. In doing so, the spacing feature prevents moisture and dirt from becoming trapped within the void between the overlay and the wheel. The spacing feature can be formed as a discrete spacing member which is attached to the panel, or formed by depositing an adhesive material onto the panel, or formed as an integrally-formed surface feature projecting from the inboard surface of the panel. The resulting overlay is a unitary member which can be subsequently assembled as a discrete unit to the wheel.

49 Claims, 4 Drawing Sheets

HEAT-RESISTANT OVERLAY FOR AN AUTOMOTIVE STEEL WHEEL

BACKGROUND OF THE INVENTION

1. Field of the Invention

The present invention generally relates to automobile wheels which are equipped with a decorative overlay. More specifically, this invention relates to a heat-resistant overlay for a standard steel automobile wheel, in which the overlay is preferably formed from a high impact plastic and is equipped with a heat-resistant spacing element that serves to fill voids between the overlay and the wheel, so as to enable the overlay to be attached as a unitary assembly to the wheel.

2. Description of the Prior Art

Chrome-plated aluminum wheels have become very popular, particularly with both sports cars and prestigious automobiles. However, the vast majority of wheels produced in the automotive industry are standard steel wheels which are not stylized to enhance their appearance, and therefore have minimal aesthetic appeal, even if painted or chrome plated. As a result, standard steel wheels are equipped with an ornamental wheel cover in order to cover their outboard surface. While many wheel covers are mechanically attached, others are adhered to the outboard surface of the wheel, as illustrated by U.S. Pat. No. 3,915,502 to Connell.

Similarly, U.S. Pat. No. 3,669,501 to Derleth teaches an annular-shaped cover, or overlay, composed of a thin plastic cover, preferably formed from acrylonitrile-butadiene-styrene (ABS), which is axially spaced away from the outboard surface of the wheel to provide a cavity between the overlay and the wheel. During assembly, an adhesive foamable polyurethane is coated on the wheel, and the cover is then quickly clamped to the wheel before the polyurethane begins to foam. As such, the wheel and the cover form a mold for the polyurethane foam, such that the polyurethane foam fills the cavity between the cover and the wheel and serves to permanently adhere the cover to the wheel.

Derleth teaches that the polyurethane foam adhesive provides a low-density, semi-resilient reinforcement for the thin gauge plastic cover while also providing sound insulation for tire and wind noise. However, it is understood by those skilled in the art that another reason for spacing the overlay's cover from the wheel surface is to avoid the deleterious effects of heat generated by the wheel and brake which would otherwise distort the plastic cover and delaminate any metal plating applied thereto. This is particularly true in the immediate region of the wheel hub where temperatures tend to be much higher than in the remainder of the wheel. As a result, definite styling and design limitations are associated with the use of the overlay taught by Derleth.

Another shortcoming of the overlay taught by Derleth is that the foam adhesive is formed in situ on the wheel, necessitating that the wheel be available to the overlay manufacturer and handled during the production of the overlay, rendering a manufacturing process which is somewhat complicated and awkward, and reliant upon the continuous availability of wheels, a condition which may be impractical for just-in-time manufacturing programs. Furthermore, timing of the processing steps used in the manufacture of Derleth's overlay is critical in order to ensure that the cover is properly positioned over the wheel before the polyurethane begins to foam.

Others have taken the in situ technique of Derleth a step further by employing a process in which the entire overlay is formed in situ on the wheel. An early example of this technique is taught by U.S. Pat. No. 3,762,677 to Adams, in which a wheel is used to form a mold cavity with a mold half, and a reaction mixture is injected into the mold cavity to form a complete overlay. Variations of this process have been proposed, including U.S. Pat. No. 4,659,148 to Grill, which teaches assembling a metal retainer to the wheel over the wheel's hub area in order to space the overlay axially away from the center of the wheel, thus reducing thermal conduction from the wheel hub to the overlay. In effect, the wheel and retainer cooperate to form half of the mold required to mold the overlay.

Yet another variation is taught by U.S. Pat. Nos. 4,976,497 and 5,128,085 to Post et al., in which an insert is secured to the wheel prior to molding the overlay in situ on the wheel surface. As such, the insert and wheel together form a mold half for the overlay. According to Post et al., the insert is hollow and thereby serves to reduce the weight of the overlay. Another notable variation on the teachings of Adams is disclosed in U.S. Pat. No. 5,143,426 to Todd, in which a two step molding operation is used to form a low density base in situ on the wheel, and then a higher density plastic cover is molded in situ over the base to form a composite overlay.

In addition to their styling being limited by the adverse effects of high temperatures, the ornamental plastic overlays of the above prior art all share a common disadvantage, in that they require the use of a wheel as a mold half for the manufacture of an overlay. As noted previously, such a requirement results in a somewhat complicated and awkward production process which is reliant on the availability of wheels for the manufacture of the overlay.

Contrary to the prior art noted above, U.S. patent application Ser. No. 07/904,180 to Chase, assigned to the assignee of this invention, teaches a metal plated overlay which is formed independently and separately from the wheel to which it is to be attached. In particular, Chase teaches a method of producing a cast aluminum wheel having the aesthetic appearance of being metal plated, even in deep recesses in the wheel. The overlay which contributes to this appearance is a metal-plated plastic panel which is permanently adhered directly to the surface of the wheel and closely follows the contours of the wheel, including deep recesses such as turbine openings in the wheel. Together, the cast aluminum wheel and the metal-plated overlay form a composite cast aluminum wheel that can be provided as original equipment by automobile manufacturers. Notably, the metal plating process taught by Chase enables the overlay to extend and cover high temperature regions of the wheel which prior art overlays are incapable of withstanding. Unfortunately, the overlay taught by Chase is not adapted for use on standard steel wheels, in that the manner in which the overlay closely follows the contours of the wheel would result in an appearance which is limited by the surface contours of the steel wheel which, as noted above, has minimal aesthetic appeal.

From the above discussion, it can be readily appreciated that the prior art does not disclose an overlay for a standard steel wheel which does not involve the use of the wheel as a mold half during the production of the overlay. More particularly, the teachings of Derleth and Adams and its progeny require forming the overlay in situ on the wheel, which raises various processing disadvantages. Furthermore, the prior art overlays are limited in their appearance by the requirement that they be axially spaced and isolated from the outboard surface of the wheel in order to avoid the adverse effects of the elevated wheel temperatures.

Accordingly, what is needed is a method for manufacturing an overlay which is adapted to be attached to a standard automotive steel wheel so as to promote the aesthetic appearance of the wheel. More particularly, such a method would yield an overlay which is a discrete component which can be shipped and attached to the wheel at practically any point after the manufacture of the wheel. As such, production of the overlay is not reliant on the availability of a steel wheel, and the overlay is potentially available as an add-on item. Ideally, such an overlay could be secured directly to portions of the wheel without requiring thermal insulation between the overlay and the wheel.

SUMMARY OF THE INVENTION

According to the present invention there is provided a method for providing a decorative surface on a standard steel wheel, without requiring the use of the wheel in the production of the decorative surface. The decorative surface of this invention is provided by an overlay composed of a solid panel member which is attached directly to the surface of the wheel and which closely conforms to certain portions of the wheel, while being spaced apart from other portions of the wheel in order to form exterior surface contours which contribute an aesthetically pleasing appearance to the wheel. Importantly, the overlay is manufactured independently of the wheel, and can subsequently be attached to a steel wheel to form a composite steel wheel.

Generally, the overlay is adapted to be assembled to a steel wheel composed of a disc portion and a rim portion which circumscribes the disc portion. The disc portion defines the outer axial surface of the wheel which the overlay is to cover once assembled to the wheel. The panel member has an outboard surface and an oppositely disposed inboard surface. Preferably, a metal layer is electrochemically plated onto the outboard surface of the panel member, so as to contribute an aesthetically pleasing appearance to the overlay. The panel member preferably has a thickness of as little as about 2 to about 4 millimeters so as to minimize the weight of the overlay, while still providing sufficient impact strength. Preferably, the panel member is formed from an ABS-modified polycarbonate, such that thee panel member and its metal plating are highly resistant to the adverse thermal environment of the wheel. As a result, the metal-plated outboard surface of the panel member can be allowed to uniformly and closely follow the contours of the axial surface of the wheel, while resisting delamination of the metal plating due to heat.

A first portion of the panel member's inboard surface is configured to mate with a first portion of the axial surface of the wheel upon assembling the overlay to the wheel, such that the first portion of the inboard surface will be contiguous with the first portion of the axial surface. A second portion of the inboard surface is configured to be spaced apart from a second portion of the axial surface of the wheel upon the overlay being assembled to the wheel, such that the second portion of the inboard surface and the second portion of the axial surface form a void therebetween. In practice, the second portion of the axial surface is a feature or contour which is preferably concealed, such as the joint line between the wheel disk and rim.

The overlay further includes a spacing feature disposed at the second portion of the inboard surface of the overlay. In accordance with this invention, the spacing feature is configured to mate with the second portion of the wheel's axial surface and thereby fill the void between the second portion of the inboard surface and the second portion of the axial surface. The spacing feature can be formed as a discrete spacing member which is attached to the second portion of the inboard surface by any suitable method, such as by bonding or insert molding the spacing member to the second portion of the inboard surface. Alternatively, the spacing feature can be formed by depositing an adhesive material onto the second portion of the inboard surface, or as an integrally-formed surface feature projecting from the inboard surface of the panel member.

As a result of the above construction, the overlay is a unitary member which can be subsequently assembled as a discrete unit to the wheel, such that the first portion of the inboard surface mates with and is contiguous with the first portion of the axial surface of the wheel, and such that the spacing feature is intermediate the second portion of the overlay's inboard surface and the second portion of the wheel's axial surface. In doing so, the spacing feature prevents moisture and dirt from becoming trapped within the void between the overlay and the wheel.

In view of the above-described structure, the overlay of this invention is produced in a manner entirely different from prior art overlays for steel wheels. Generally, the method includes the steps of forming the solid panel member, which forms the outboard and inboard surfaces of the overlay, including the first and second portions of the inboard surface. The spacing feature is provided at the second portion of the panel member, and is appropriately formed to mate with the second portion of the wheel's axial surface so as to fill the void between the overlay's inboard surface and the wheel's axial surface. As noted before, the spacing feature can be formed as a discrete spacing member which is attached to the second portion of the inboard surface, or as an adhesive material deposited onto the second portion, or as an integrally-formed surface feature projecting from the inboard surface. Thereafter, the overlay can then be assembled at any convenient time to the wheel as a discrete unit.

According to a preferred aspect of this invention, the overlay of the present invention provides an aesthetically pleasing, ornamental cover to a standard automotive steel wheel, yet is manufactured entirely separately from the wheel to which it will be mounted. As such, the overlay of this invention is not formed in situ on the wheel, and the wheel is not required to manufacture the overlay. Advantageously, the overlay manufacturer is not required to receive and handle wheels during the manufacture of the overlay, resulting in a significantly less complicated and awkward production process as compared to prior art methods. This aspect is particularly advantageous when production is part of a just-in-time manufacturing program.

Furthermore, because the overlay does not entirely conform to the contours of the steel wheel, but includes surface contours corresponding to the second portion of the overlay's inboard surface, the overlay contributes aesthetically pleasing styling to the wheel. Finally, the overlay is highly resistant to the higher service temperatures in the vicinity of the wheel hub, such that the entire overlay need not be spaced away from the surface of the wheel, nor is there a need for a continuous insulating layer between the overlay and the wheel. As a result, design flexibility of the composite wheel is maximized because the overlay does not pose any significant styling limitations to the wheel as a consequence of avoiding the high temperature areas of the wheel.

Accordingly, it is an object of the present invention to provide an ornamental overlay for a standard automotive steel wheel, in which portions of the overlay closely conform to and are attached to the axial surface of the wheel while other portions of the overlay are spaced apart from the wheel, such that the aesthetic styling of the wheel is provided in part by the overlay.

It is a further object of the invention that the overlay be manufactured by a method which does not entail the use of a steel wheel for purposes of forming the overlay in situ on the wheel.

It is still a further object of the invention that the method involve forming the overlay as a discrete unit which can be assembled to the wheel at practically any time after the manufacture of the wheel.

It is another object of the invention that the overlay include a spacing feature which fills voids present between the overlay and the wheel, so as to prevent the entrapment of water and dirt between the overlay and wheel.

It is yet another object of the invention that the overlay be formed from a suitable material which is both heat and impact resistant, and which can permanently adhere a metal plating.

It is still another object of the invention that the overlay be formed as a thin panel so as to minimize the weight of the overlay.

Other objects and advantages of this invention will be more apparent after a reading of the following detailed description taken in conjunction with the drawings provided.

DETAILED DESCRIPTION OF THE PREFERRED EMBODIMENT

Figures 1, 2:
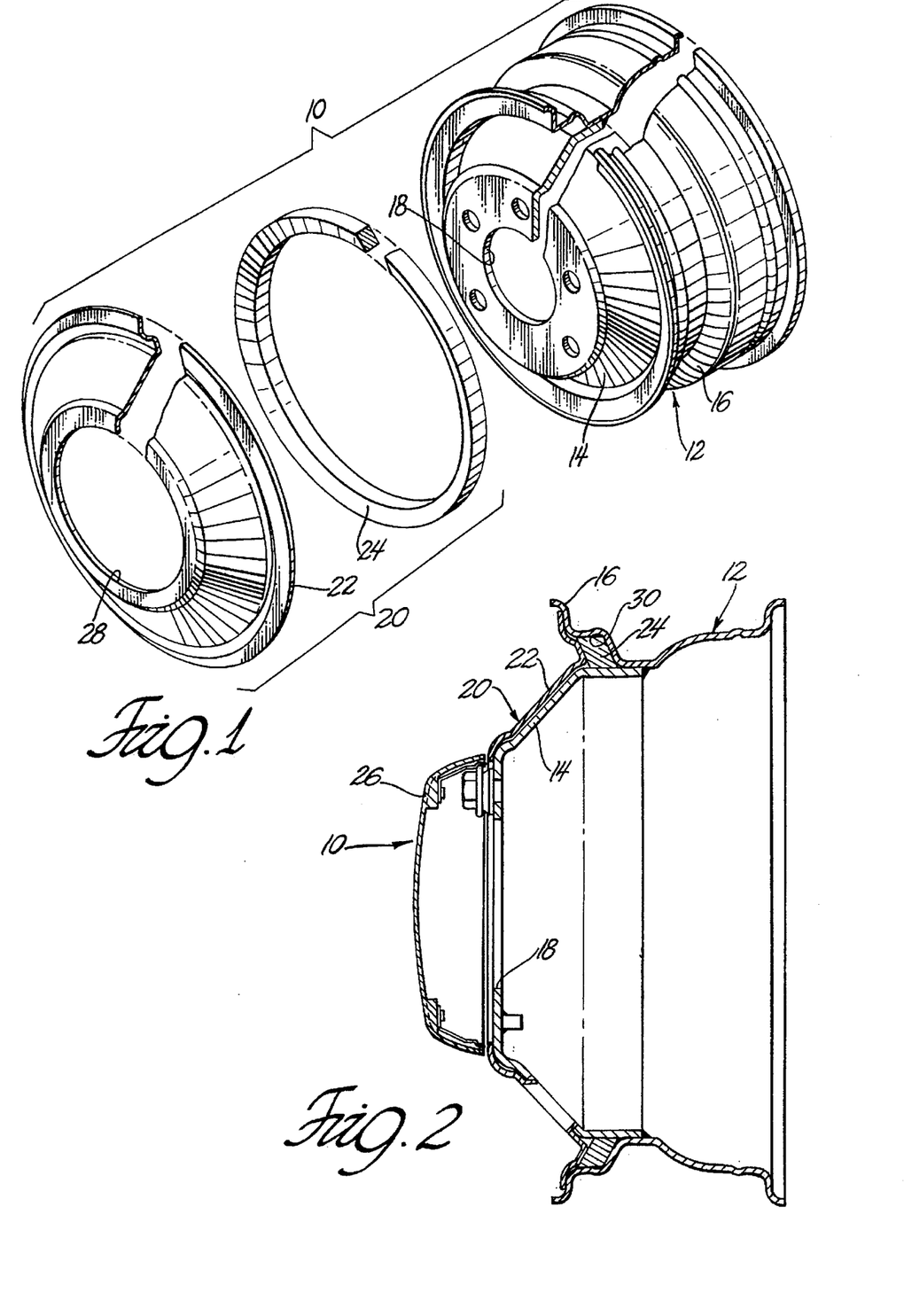
FIG. 1 is an exploded view of a standard automotive steel wheel which is equipped with a discrete overlay composed of a panel and spacing member in accordance with a first embodiment of this invention.
FIG. 2 is a cross-sectional view of the wheel of FIG. 1.

With reference to FIG. 1, there is shown an exploded view of a composite wheel 10 for an automobile. The wheel 12 of the composite wheel 10 includes a wheel disk 14 which defines an outboard surface of the composite wheel 10, a rim 16 which is welded to the perimeter of the wheel disk 14 so as to circumscribe the wheel disk 14, and a hub opening 18 through which the wheel hub projects when the composite wheel 10 is mounted to an automobile. Though the wheel 12 may be formed from any suitable material, in the context of the present invention, the wheel is a standard steel wheel of the type often provided on automobiles. As such, and as shown in FIG. 1, the wheel 12 is not stylized for the purpose of enhancing its appearance, and therefore has minimal aesthetic appeal, even if it were painted or chrome plated.

As also shown in FIG. 1, the composite wheel 10 further includes an overlay 20 formed by a cover panel 22 and a spacing element 24. The cover panel 22 is generally annular-shaped, having a central opening 28 to allow access to the wheel hub after removal of a hub cap 26, shown in FIG. 2. As more readily seen in FIG. 2, the cover panel 22 is preferably a thin gauge, solid panel which is secured directly to the outboard surface of the wheel disk 14. The shape and size of the cover panel 22 is specifically designed to correspond to the surface of the wheel 12 to permit portions of the wheel 12 to define the styling of the composite wheel 10. More particularly, certain portions of the cover panel 22 correspond closely to the contour of the wheel disk 14, such that the overlay 20 appears to be the exterior axial surface of the wheel 12. Where the overlay 20 conforms closely to the wheel disk 14, the underlying portions of the wheel 12 contribute to the styling of the composite wheel 10, while the overlay 20 provides a visible ornamental effect.

However, as seen in FIG. 2, the entire cover panel 22 does not conform to the wheel disk 14, but instead certain portions of the cover panel 22 are axially spaced apart from the wheel disk 14. For example, where portions of the wheel 12 are excessively recessed or are otherwise preferably concealed, portions of the cover panel 22 are used to cover these regions by being axially spaced from the surface of the wheel 12, allowing for additional design flexibility for the appearance of the composite wheel 10. The spacing element 24 is positioned relative to the cover panel 22 to fill the resulting void 30 created between the cover panel 22 and the wheel 12, such that these portions of the overlay 20 also contribute to the styling of the composite wheel 10. The spacing element 24 serves to prevent the entrapment of water and dirt between the overlay 20 and the wheel 12, which would otherwise promote corrosion and cause balancing problems for the composite wheel 10. Though the spacing element 24 is shown as being limited to the perimeter of the wheel disk 14, additional contours in the cover panel 22 and/or the wheel disk 14 could necessitate the use of one or more additional spacing elements to fill the resulting voids between the cover panel 22 and the wheel 12. Consequently, the present invention enables an aesthetically appealing appearance to be provided for the wheel 12, even though the wheel 12 is a standard and unstylized steel wheel.

In accordance with this invention, the cover panel 22 of the overlay 20 is preferably formed from a thin ABS-modified polycarbonate by injection molding, though other molding techniques could foreseeably be used. The ABS-modified polycarbonate preferably is a polycarbonate substrate which has been modified with up to about 50 percent by weight of ABS, and more preferably between about 15 to about 40 weight percent, and conditioned to increase the amount of exposed ABS at the outboard surface of the cover panel 22. While this ABS-modified polycarbonate material is preferred, those skilled in the art will recognize that other polymer materials can also be used, such as unmodified polycarbonate, unmodified ABS, nylon-polycarbonate, polyurethane, and butadiene-loaded ABS. For the embodiment shown in FIGS. 1 and 2, the cover panel 22 is preferably between about 2 and about 4 millimeters thick to readily blend with the surrounding surface of the wheel disk 14 while contributing sufficient strength to the overlay 20, though greater or lesser thicknesses could be used.

In the preferred embodiment, the outboard surface of the overlay 20 is plated with a suitable decorative treatment, such as a chromium plating. Ideally, the chromium plating is electroplated to the cover panel 22 such that the overlay 20 is lightweight and has a superior chromium plating-to-plastic bond adhesion. A preferred electroplating process is disclosed in U.S. patent application Ser. No. 07/617,497, and assigned to the assignee of the present invention. Generally, this method entails chemically pretreating or conditioning an ABS-modified polycarbonate substrate, etching with an acidic solution, electrolessly plating a layer of metal strike, and finally electrochemically depositing the desired chromium plating on to the metal strike. The method forms an electroplated plastic article, in which the adhesion between an ABS-modified polycarbonate substrate and an electroplated metal is exceptional, such that upon impact the metal plating adheres well without chipping, cracking or delamination from the substrate. In addition, the adhesion between the metal plating and the substrate is highly resistant to temperature and corrosion.

The resulting overlay 20 is highly resistance to impact, corrosion and temperature. The improved adhesion between the chromium plating and the cover panel 22 resists delamination from chemical attack and high temperatures found at the surface of the wheel 12. As a result, the overlay 20 can be secured directly to the surface of the wheel 12, as shown in FIG. 2, without the need to insulate the chromium plating from the surface of the wheel 12 to avoid the elevated temperatures there.

While the cover panel 22 of the present invention is preferably formed from the ABS-modified polycarbonate as discussed above, it will be apparent that other suitable materials such as stainless steel, aluminum or bi-metals may be used.

The spacing element 24 of the present invention can be formed by various techniques generally known in the art. Generally, the spacing element 24 shown in FIGS. 1 and 2 can be molded from a heat-resistant structural foam material, such as a suitable thermoplastic. The spacing element 24 can be molded separately from the cover panel 22, and then bonded or mechanically secured to the appropriate portions of the cover panel 22 as to form a two-component overlay 20. Alternatively, the spacing element 24 can be molded separately, and then insert molded in the cover panel 22 as to form a unitary overlay 20.

With any of the above approaches, the resulting overlay 20 can be permanently secured directly to the outboard surface of the wheel 12 by a suitable adhesive, such as a silicone or polyurethane adhesive, to form a composite wheel 10. Alternatively, the overlay 20 can be mechanically attached to the wheel 12 with fasteners.

Figure 3:
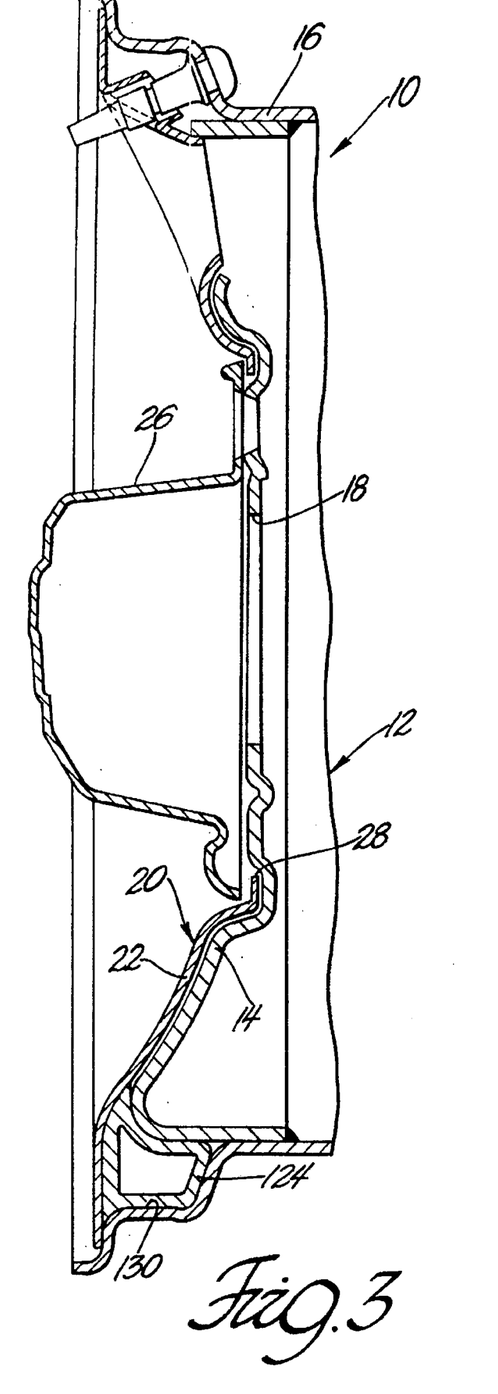
FIGS. 3 through 7 are partial cross-sectional views of standard steel wheels, each of which is equipped with a discrete overlay composed of a panel and spacing feature in accordance with alternative embodiments of this invention.

A second embodiment of the present invention is illustrated in FIG. 3, in which the spacing element 124 is shown as having a hollow structure. Known methods for forming the spacing element 124 include gas assist molding and blow molding techniques as well as extrusion methods. As before, the spacing element 124 can be bonded or mechanically secured to the appropriate portions of the cover panel 22 so as to form a two-component overlay 20, or insert molded to the cover panel 22 so as to form a unitary overlay 20.

Figure 4:
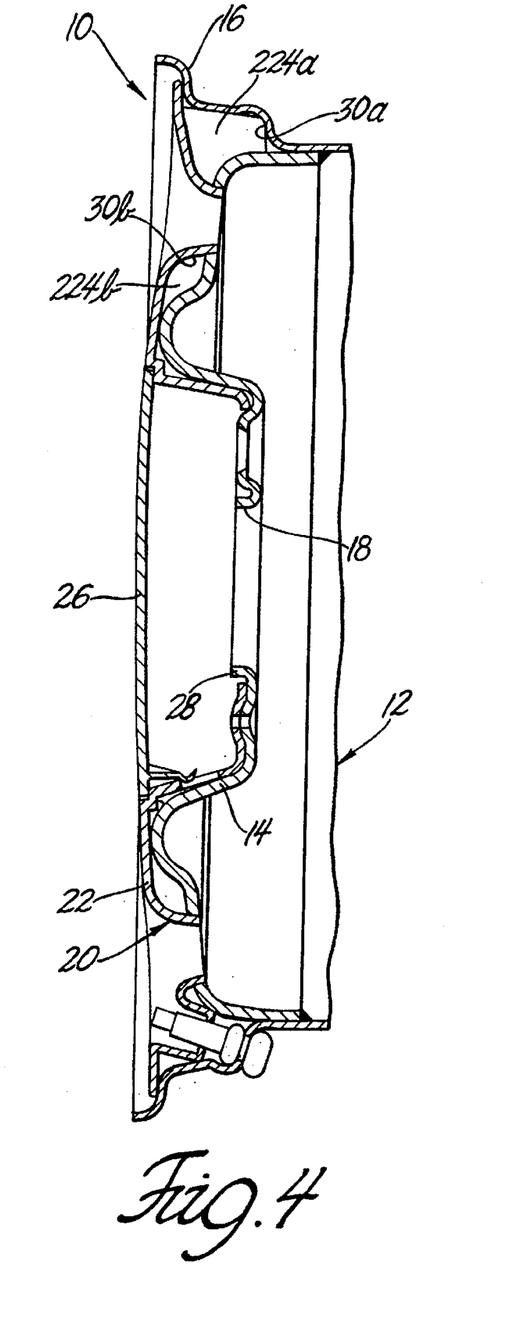

A third embodiment of the present invention is illustrated in FIG. 4, in which a pair of spacing elements 224a and 224b are molded from a heat-resistant urethane foam using a close mold or an open mold technique known in the art. As shown, the first spacing element 224a serves to fill a void 30a near the perimeter of the wheel disk 14, while the second spacing element 224b serves to fill a void 30b which circumscribes the central opening 28 in the cover panel 22. As before, the spacing elements 224a and 224b can be bonded or mechanically secured to the appropriate portions of the cover panel 22 so as to form a two-component overlay 20, or insert molded to the cover panel 22 so as to form a unitary overlay 20.

FIG. 4 also serves to illustrate fourth and fifth embodiments of this invention, in which the spacing elements 224a and 224b may be formed by a two-shot molding process during the molding of the cover panel 22. Alternatively, the spacing elements 224a and 224b can be formed from a foam adhesive which is deposited onto the cover panel 22 in a sufficient quantity to completely fill the voids 30a and 30b between the cover panel 22 and the wheel disk 14.

Figure 5:
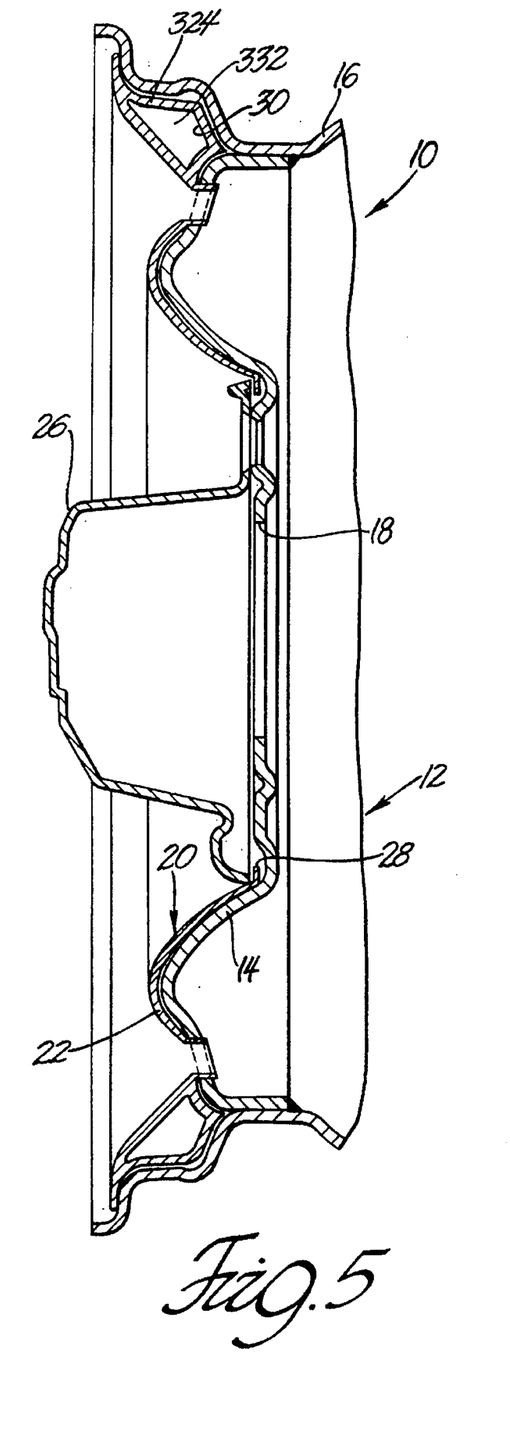

FIG. 5 illustrates a sixth embodiment of the present invention, in which the spacing element 324 is an integrally-formed surface feature projecting from the inboard surface of the cover panel 22. The cover panel 22 and spacing element 324 of this embodiment are preferably formed by a one-shot gas assist injection molding technique which forces the preferred ABS-modified polycarbonate material against the interior walls of the mold in which the cover panel 22 and spacing element 324 are simultaneously molded. This approach advantageously eliminates the step of bonding or mechanically securing the spacing element 324 to the appropriate portions of the cover panel 22, and yields an integral and unitary overlay 20. If desired, a cavity 332 within the spacing element 324 can be filled with a urethane foam (not shown) in order to enhance the sound-deadening capability of the overlay 20.

Figure 6:
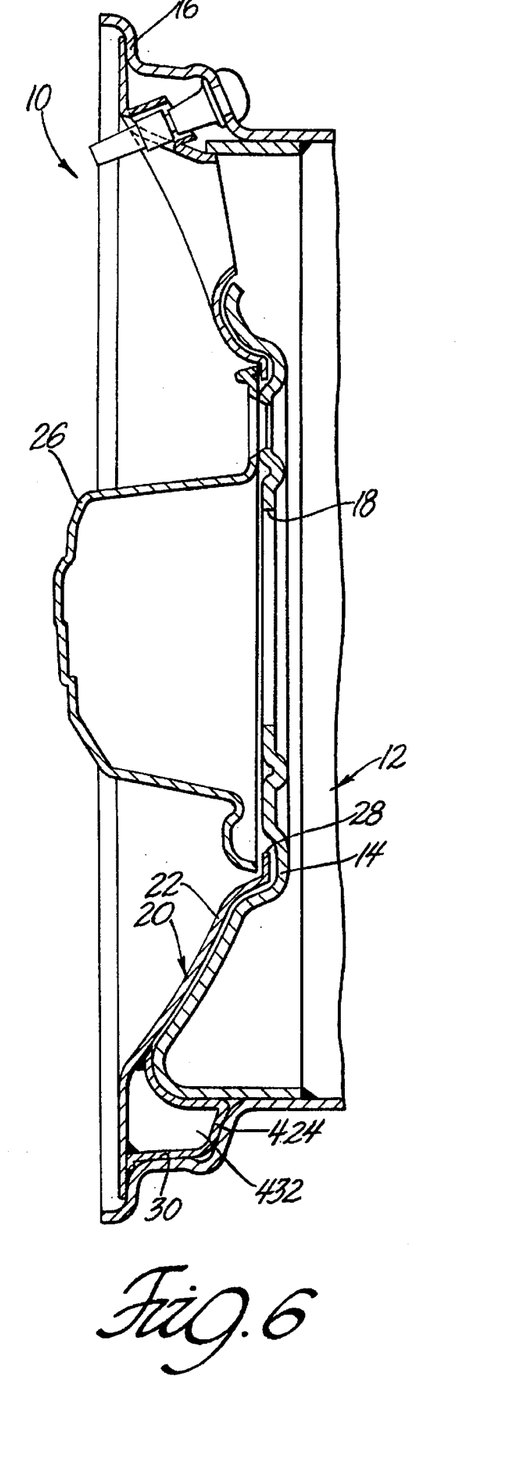

FIG. 6 illustrates a seventh embodiment of the present invention, in which the spacing element 424 is a shell which is bonded to the inboard surface of the cover panel 22. The spacing element 424 of this embodiment can be injection molded from any suitable heat-resistant thermoplastic material, as well as various other suitably rigid and readily formable materials. The cavity 432 within the spacing element 424 can also be subsequently filled with a foam (not shown), as noted above.

Figure 7:
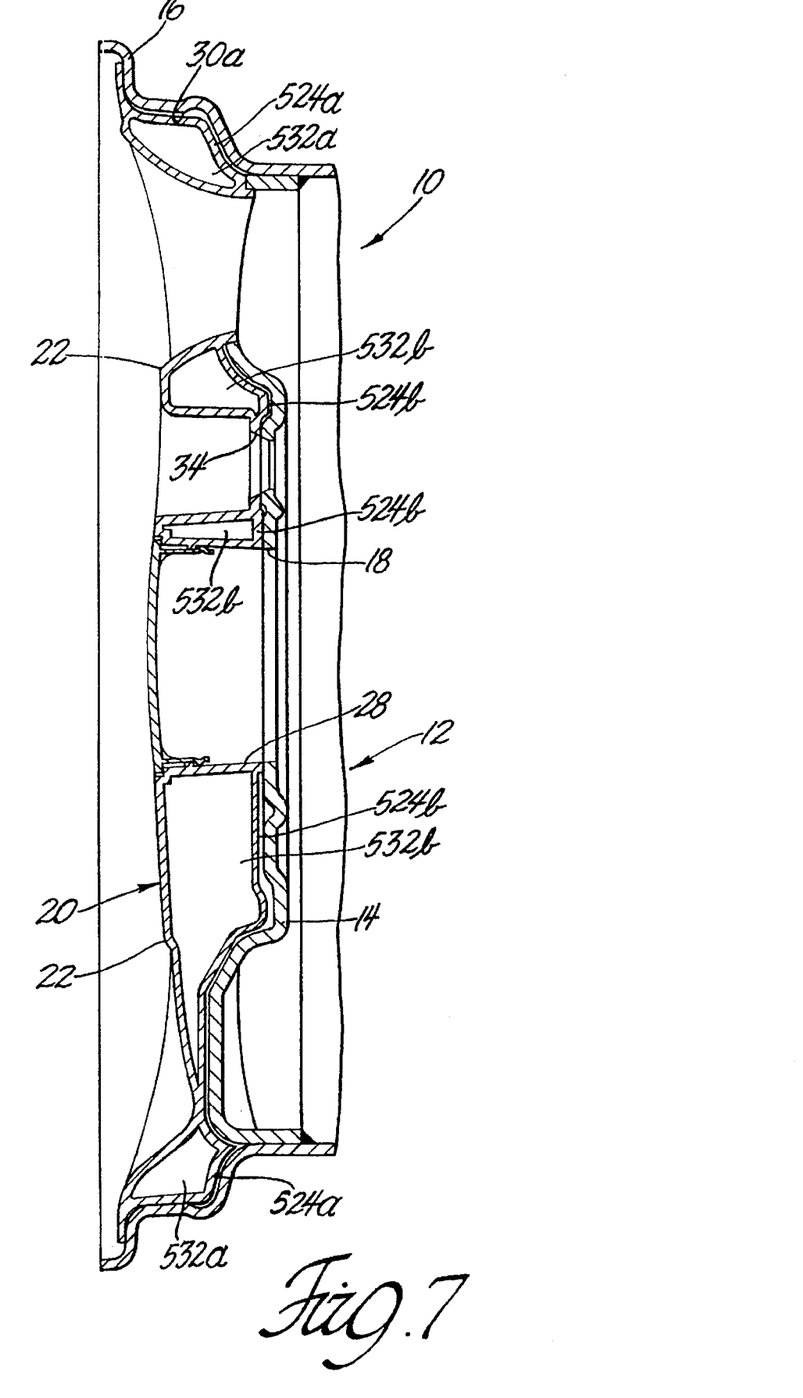

Finally, FIG. 7 illustrates an eighth embodiment of the present invention, in which a pair of spacing elements 524a and 524b are integrally-formed surface features projecting from the inboard surface of the cover panel 22. The cover panel 22 and spacing elements 524a and 524b of this embodiment are preferably blow molded, resulting in the outboard and inboard surfaces of the cover panel 22 being axially spaced apart by cavities 532a and 532b formed within the cover panel 22. Notably, though the cavities 532a and 532b are present within the cover panel 22, certain portions of the cover panel 22 remain in contact with the wheel 12, such as in the area of a lug bolt opening 34. As with the embodiment of FIG. 5, this approach advantageously eliminates the step of bonding or mechanically securing the spacing elements 524a and 524b to the appropriate portions of the cover panel 22, and yields an integral and unitary overlay 20. If desired, the cavities 532a and 532b can be filled with a urethane foam (not shown) in order to enhance the sound-deadening capability of the overlay 20.

From the above, it can be seen that a significant advantage of the composite wheel 10 of the present invention is that the overlay 20 can provide an aesthetically pleasing, ornamental cover to a standard steel wheel 12 without requiring the use of the wheel 12 during the manufacture of the overlay 20. Specifically, the overlays 20 of this invention are manufactured entirely separately from the wheel 12, and are not formed in situ on the wheel 12 as taught by the prior art. As a result, the wheel 12 is not required to manufacture any of the overlays 20 of this invention. Instead, the overlays 20 can be attached as a discrete unit directly to the axial surface of the wheel 12 by a suitable adhesive, or the overlay 20 can be mechanically attached as a discrete unit to the wheel 12 with fasteners. As an advantageous result, the overlay manufacturer is not required to receive and handle wheels during the manufacture of the overlay 20, such that the method of this invention is significantly less complicated and awkward than prior art methods. This aspect is particularly advantageous when production is part of a just-in-time manufacturing program.

Importantly, the spacing elements of this invention serve to fill voids between the cover panel 22 and the wheel 12 which are formed as a result of certain portions of the cover panel 22 not conforming to the axial surface of the wheel 12. As such, the spacing elements serve to prevent entrapment of water and dirt between the cover panel 22 and the wheel 12, which would otherwise promote corrosion and adversely effect the balance of the composite wheel 10. Where the cover panel 22 does not conform to the contours of the wheel 12, it is able to conceal certain surface features and contours on portions of the wheel 12, such that the overlay 20 also contributes styling to the composite wheel 10. For example, the overlay 20 can be configured to be axially spaced apart from the wheel disk 14 in order to bridge or otherwise cover the joint line between the wheel disk 14 and the rim 16, as shown in FIG. 2. In this manner, the overlay 20 also contributes to the styling of the composite wheel 10. Alternatively, the overlay 20 can be configured to be axially spaced apart from the wheel disk 14 in the region surrounding the central opening 28 of the hub in order to achieve a desirable styling effect, as shown in FIGS. 4 and 7.

Notably, the overlay 20 is highly resistant to the higher service temperatures in the vicinity of the wheel hub, such that the entire overlay 20 need not be spaced away from the surface of the wheel disk 14, nor is there a need for a continuous insulating layer between the overlay 20 and the wheel disk 14. Therefore, another advantage of the present invention is that the overlay 20 can be configured to closely conform to portions of the axial surface of the wheel 12 such that a chromium plating on the outboard surface of the overlay 20 appears to be deposited directly on the wheel 12. The adhesion between a chromium plating and the cover panel 22 exhibits extremely good resistance to high temperatures, such that no insulating layer of foam is necessary between the chromium plating and the wheel 12. Design flexibility of the composite wheel 10 is then optimized because the overlay 20 does not pose any significant design limitations to the styling of the composite wheel 10.

While the invention has been described in terms of preferred embodiments, it is apparent that other forms could be adopted by one skilled in the art. Accordingly, the scope of the invention is to be limited only by the following claims.

What is claimed is:

1. An overlay and wheel assembly, said wheel having a disk portion and a rim portion circumscribing said disk portion, said disk portion defining an axial surface of said wheel, said axial surface having a first portion and a second portion complementary with said first portion, said overlay comprising:

a metal plated panel member having an outboard surface and an inboard surface oppositely disposed from said outboard surface, said inboard surface having a first portion and a second portion, said first portion of said inboard surface of said metal plated panel member being configured to mate with said first portion of said axial surface of said wheel upon attaching said metal plated panel member as a discrete unit to said wheel, such that said first portion of said inboard surface is juxtaposed said first portion of said axial surface;

said second portion of said inboard surface of said metal plated panel member being configured to be spaced apart from said second portion of said axial surface of said wheel upon attaching said metal plated panel member to said wheel, such that said second portion of said inboard surface and said second portion of said axial surface define a void therebetween;

a spacing member fixedly mounted in said void, said spacing member being contiguous said second portion of said axial surface of said wheel and said second portion of said inboard surface of said metal plated panel member to thereby fill said void, said spacing member further being attached to said second portion of said axial surface of said wheel; and means for attaching said metal plated panel member as a discrete unit to said disk portion of said wheel, said attaching means being disposed between said first portion of said inboard surface of said metal plated panel member and said first portion of said axial surface of said disk portion of said wheel;

whereby said metal plated panel member is a unitary member which is mounted as a discrete independent unit to said wheel such that said means for attaching said metal plated panel member to said disk portion of said wheel maintains said first portion of said axial surface of said wheel and said first portion of said metal plated panel member juxtaposed to each other while said spacing member is contiguous with said second portion of said axial surface of said wheel and said second portion of said inboard surface of said metal plated panel member so as to be independently mounted in said void.

2. The overlay and wheel assembly of claim 1 wherein said second portion of said inboard surface underlies a portion of said spacing member.

3. The overlay and wheel assembly of claim 2 wherein said spacing member is adhesively bonded to said second portion of said inboard surface.

4. The overlay and wheel assembly of claim 2 wherein said spacing member is insert molded to said second portion of said inboard surface of said wheel.

5. The overlay and wheel assembly of claim 2 wherein said spacing member is an adhesive material adhered only to said second portion of said inboard surface of said metal plated panel member.

6. The overlay and wheel assembly of claim 5 wherein said first portion of said inboard surface and said first portion of said axial surface define a second void and further comprise a second spacing member in said second void, said second spacing member being contiguous said first portion of said inboard surface and said first portion of said axial surface.

7. The overlay and wheel assembly of claim 1 wherein said spacing member is an integrally-formed surface feature projecting from said inboard surface.

8. The overlay and wheel assembly of claim 1 wherein said spacing member has an internal cavity.

9. The overlay and wheel assembly of claim 8 further comprising a material disposed within said internal cavity.

10. The overlay and wheel assembly of claim 8 further comprising a first intermediate surface interposed said first portion of said inboard surface and said first portion of said outboard surface of said metal plated panel member; and a second intermediate surface interposed said first intermediate surface and said first portion of said outboard surface of said metal plated panel member, said first and second intermediate surfaces defining a void between said inboard and said outboard surfaces of said metal plated panel member.

11. The overlay and wheel assembly of claim 10 further comprising a wall segment located along said first portion of said inboard surface, said wall segment separating said void from said internal cavity of said spacing member.

12. The overlay and wheel assembly of claim 1 further comprising a first intermediate surface interposed said first portion of said inboard surface and said first portion of said outboard surface of said metal plated panel member; and a second intermediate surface interposed said first intermediate surface and said first portion of said outboard surface of said metal plated panel member, said first and second intermediate surfaces defining a void between said inboard and outboard surfaces of said metal plated panel member.

13. The overlay and wheel assembly of claim 1 wherein said metal plated panel member is a metal plated plastic panel member.

14. An overlay and wheel assembly, said wheel having a disk portion and a rim portion circumscribing said disk portion, said disk portion defining an axial surface of said wheel, said overlay comprising:

a solid ornamental panel member having an outboard surface and an inboard surface oppositely disposed from said outboard surface, said inboard surface having a first portion and a second portion, said first portion of said inboard surface of said solid ornamental panel member being configured to mate with a first portion of said axial surface of said wheel upon assembling said solid ornamental panel member to said wheel, such that said first portion of said inboard surface is juxtaposed with said first portion of said axial surface;

said second portion of said inboard surface of said solid ornamental panel member being configured to be spaced apart from a second portion of said axial surface of said wheel upon assembling said solid ornamental panel member to said wheel, such that said second portion of said inboard surface and said second portion of said axial surface form a void therebetween;

a spacing member fixedly mounted in said void, said spacing member being contiguous said second portion of said inboard surface and said second portion of said axial surface of said wheel and thereby filling said void, said spacing member further being attached to said second portion of said axial surface of said wheel; and a metal layer electrochemically plated onto said outboard surface of said solid ornamental panel member;

whereby said solid ornamental panel member is a unitary member which is mounted as a discrete independent unit to said wheel such that said first portion of said inboard surface of said solid ornamental panel member mates with and is juxtaposed said first portion of said axial surface of said wheel, and such that said spacing member is intermediate said second portion of said inboard surface and said second portion of said axial surface of said disk portion of said wheel.

15. The overlay and wheel assembly of claim 14 wherein said spacing member is adhesively bonded to said second portion of said inboard surface.

16. The overlay and wheel assembly of claim 14 wherein said spacing member is insert molded to said second portion of said inboard surface of said wheel.

17. The overlay and wheel assembly of claim 14 wherein said spacing member is formed from a heat-resistant material.

18. The overlay and wheel assembly of claim 14 wherein said spacing member has an internal cavity.

19. The overlay and wheel assembly of claim 18 further comprising a material disposed within said internal cavity.

20. The overlay and wheel assembly of claim 14 wherein said spacing member is an adhesive material adhered only to said second portion of said inboard surface.

21. The overlay and wheel assembly of claim 14 wherein said solid ornamental panel member is a solid plastic ornamental panel member.

22. In a composite overlay and wheel assembly of the type wherein a wheel having a disk portion and a rim portion circumscribes said disk portion, said disk portion defining an axial surface of said composite overlay and wheel assembly and a metal plated panel member attached to said axial surface of said disk portion, said metal plated panel, member having an outboard surface and an inboard surface oppositely disposed from said outboard surface, a first portion of said inboard surface mating with a first portion of said axial surface, a second portion of said inboard surface being axially spaced apart from a second portion of said axial surface so as to form a void therebetween, the improvement comprising:

a discrete spacing member mounted in said void contiguous said second portion of said inboard surface and said second portion of said axial surface, said discrete spacing member substantially filling said void so as to prevent moisture and/or dirt from becoming trapped within said void between said metal plated panel member and said wheel, said discrete spacing member further being formed from a heat-resistant material;

said metal plated panel member being a unitary plastic panel member secured as a discrete unit to said composite overlay and wheel assembly;

said first portion of said inboard surface being juxtaposed said first portion of said axial surface; and means for attaching said first portion of said inboard surface of said metal plated panel member to said axial surface of said disk portion of said wheel.

23. The composite overlay and wheel assembly of claim 22 wherein said means for attaching comprises an adhesive located between said first portion of said inboard surface of said metal plated panel member and said axial surface of said disk portion of said wheel.

24. The composite overlay and wheel assembly as claimed in claim 22 wherein said means for attaching comprises a mechanical attachment means located between said metal plated panel member and said wheel.

25. The overlay and wheel assembly of claim 22 wherein said metal plated panel member is a metal plated plastic panel member.

26. A method for making an overlay and wheel assembly, said wheel having a disk portion and a rim portion circumscribing said disk portion, said disk portion defining an axial surface of said wheel, said method comprising the steps of:

forming a discrete solid ornamental panel member having an outboard surface and an inboard surface oppositely disposed from said outboard surface, said inboard surface having a first portion and a second portion, said first portion of said inboard surface being configured to mate with a first portion of said axial surface of said disk portion of said wheel upon assembling said solid ornamental panel member to said wheel, such that said first portion of said inboard surface is juxtaposed said first portion of said axial surface, said second portion of said inboard surface being configured to be spaced apart from a second portion of said axial surface of said wheel upon assembling said solid ornamental panel member to said wheel, such that said second portion of said inboard surface and said second portion of said axial surface form a void therebetween;

mounting a spacing member in said void, said spacing member being mounted so as to be contiguous with said second portion of said axial surface and said second portion of said inboard surface and thereby fill said void upon assembling said solid ornamental panel member to said axial surface of said wheel; and mounting said solid ornamental panel member as a discrete unit to said axial surface of said disk portion of said wheel such that said first portion of said inboard surface is juxtaposed said first portion of said axial surface of said wheel, and such that said spacing member is contiguous said second portion of said inboard surface of said solid ornamental panel member and said second portion of said axial surface of said disk portion of said wheel so as to fill said void.

27. The method of claim 26 wherein said step of mounting said spacing member in said void further comprises forming said spacing member as a discrete spacing member, and attaching said spacing member to said second portion of said inboard surface prior to mounting said solid ornamental panel member to said wheel such that said spacing member fills said void when said solid ornamental panel member is mounted to said axial surface of said disk portion of said wheel.

28. The method of claim 27 wherein said attaching step comprises bonding said spacing member to said second portion of said inboard surface.

29. The method of claim 27 wherein said attaching step comprises insert molding said spacing member to said second portion of said inboard surface during said step of forming said solid ornamental panel member.

30. The method of claim 27 wherein said step of forming said spacing feature member comprises depositing an adhesive material onto said second portion of said inboard surface so as to form said spacing member.

31. The method of claim 26 wherein said step of mounting said spacing member comprises forming said spacing member as an integrally-formed member projecting from said second portion of inboard surface, said integrally-formed member having at least a peripheral portion integral with said second portion of said inboard surface.

32. The method of claim 26 wherein said step prior to mounting said spacing member further comprises the step of forming an internal cavity in said spacing member.

33. The method of claim 32 further comprising the step of filling said internal cavity with a fill material.

34. The method of claim 26 wherein said solid ornamental panel member is a solid plastic ornamental panel member.

35. A method for making an overlay and wheel assembly, said wheel having a disk portion and a rim portion circumscribing said disk portion, said disk portion defining an axial surface of said wheel, said overlay providing a decorative surface for said axial surface of said wheel, said method comprising the steps of:

forming a discrete solid ornamental panel member having an outboard surface and an inboard surface oppositely disposed from said outboard surface, said inboard surface having a first portion and a second portion, said first portion of said inboard surface being configured to mate with a first portion of said axial surface of said disk portion of said wheel upon assembling said solid ornamental panel member to said wheel, such that said first portion of said inboard surface is juxtaposed said first portion of said axial surfacer said second portion of said inboard surface being configured to be spaced apart from a second portion of said axial surface of said wheel upon assembling said solid ornamental panel member to said wheel, such that said second portion of said inboard surface and said second portion of said axial surface form a void therebetween;

plating said outboard surface of said solid ornamental panel member;

forming a spacing member which is configured to be mounted in said void between said second portion of said inboard surface and said second portion of said axial surface so as to be contiguous said second portion of said axial surface and said second portion of said inboard surface upon assembling said solid ornamental panel member to said wheel, and thereby fill said void;

mounting said spacing member in said void defined by said second portion of said inboard surface and said second portion of said axial surface of said wheel such that said second portion of said inboard surface is contiguous said spacing member; and assembling said solid ornamental panel member as a discrete unit to said axial surface of said wheel such that said first portion of said inboard surface is juxtaposed said first portion of said axial surface of said wheel, and such that said spacing member is contiguous said second portion of said inboard surface and said second portion of said axial surface.

36. The method of claim 35 wherein said mounting step comprises bonding said spacing member to said second portion of said inboard surface.

37. The method of claim 35 wherein said step of forming said spacing member comprises insert molding said spacing member to said second portion of said inboard surface during said step of forming said solid ornamental panel member.

38. The method of claim 35 wherein said step of forming said spacing member comprises depositing an adhesive material onto said second portion of said inboard surface so as to fill said void by forming said spacing member.

39. The method of claim 35 wherein said forming step comprises forming said spacing member to have an internal cavity.

40. The method of claim 39 further comprising the step of filling said internal cavity with a fill material.

41. The method of claim 35 wherein prior to mounting said spacing member in said void, said spacing member is attached to said second portion of said inboard surface prior to attaching said solid ornamental panel member to said wheel such that said spacing member is mounted in said void as said solid ornamental panel member is assembled to said axial surface of said wheel.

42. The method of claim 41 further comprising the step of depositing an adhesive along the surfaces of said second portion of said axial surface prior to assembling said solid ornamental panel member to said axial surface of said wheel.

43. The method of claim 35 wherein the step of forming a discrete solid ornamental panel member comprises the step of forming a discrete solid ornamental plastic panel member.

44. An overlay and wheel assembly, said wheel having a disk portion and a rim portion circumscribing said disk portion, said disk portion defining an axial surface of said wheel, said axial surface having a first portion and a second portion complementary with said first portion, said overlay comprising:

a metal plated panel member having an outboard surface and an inboard surface oppositely disposed from said outboard surface, said inboard surface having a first portion and a second portion, said first portion of said inboard surface of said metal plated panel member being configured to mate with said first portion of said axial surface of said wheel upon assembling said overlay to said wheel, such that said first portion of said inboard surface is juxtaposed said first portion of said axial surface;

said second portion of said inboard surface of said metal plated panel member being configured to be spaced apart from said second portion of said axial surface of said wheel upon attaching said metal plated panel member to said wheel, such that said second portion of said inboard surface and said second portion of said axial surface define a void therebetween;

a discrete spacing member attached to said metal plated panel member, said discrete spacing member being configured to be mounted between said second portion of said axial surface of said wheel and said second portion of said inboard surface and thereby substantially fill said void;

means for securing said discrete spacing member to said metal plated panel member, said securing means interposed said metal plated panel member and said discrete spacing member such that as said metal plated panel member is placed on said wheel said discrete spacing member is contiguous said second portion of said axial surface to substantially fill said void; and means for attaching said metal plated panel member to said axial surface of said disk portion of said wheel;

whereby said metal plated panel member and said discrete spacing member are a single unit which can be assembled as a discrete unit to said wheel such that said first portion of said inboard surface of said metal plated panel member is juxtaposed said first portion of said axial surface of said wheel, and such that said discrete spacing member is intermediate said second portion of said inboard surface of said metal plated panel member and said second portion of said axial surface of said wheel to substantially fill said void whereby moisture and/or dirt is prevented from becoming trapped within said void between said metal plated panel member and said wheel.

45. The overlay and wheel assembly of claim 44 wherein said metal plated panel member is a metal plated plastic panel member.

46. An overlay and wheel assembly, said wheel having a disk portion and a rim portion circumscribing said disk portion, said disk portion defining an axial surface of said wheel, said axial surface having a first portion and a second portion complementary with said first portion, said overlay comprising:

a metal plated panel member having an outboard surface and an inboard surface oppositely disposed from said outboard surface, said inboard surface having a first portion and a second portion, said first portion of said inboard surface of said metal plated panel member being configured to mate with said first portion of said axial surface of said wheel upon assembling said metal plated panel member to said wheel, such that said first portion of said inboard surface is juxtaposed said first portion of said axial surface of said disk portion;

said second portion of said inboard surface of said metal plated panel member being configured to be spaced apart from said second portion of said axial surface of said wheel upon assembling said metal plated panel member to said wheel, such that said second portion of said inboard surface and said second portion of said axial surface define a void therebetween;

a discrete spacing member disposed in said void, said discrete spacing member being contiguous said second portion of said axial surface and said second portion of said inboard surface and thereby substantially filling said void, said discrete spacing member having an internal cavity; and means for securing said discrete spacing member in said void;

whereby said discrete spacing member is a unitary member which is mounted as a discrete unit in said void of said wheel such that said first portion of said inboard surface of said metal plated panel member is juxtaposed to said first portion of said axial surface of said wheel, and such that said discrete spacing member is intermediate said second portion of said inboard surface of said metal plated panel member and said second portion of said axial surface of said disk portion so as to substantially fill said void as to prevent moisture and/or dirt from becoming trapped within said void between said metal plated panel member and said wheel.

47. The overlay and wheel assembly of claim 46 wherein said metal plated panel member is a metal plated plastic panel member.

48. An overlay and wheel assembly, said wheel having a disk portion and a rim portion circumscribing said disk portion, said disk portion defining an axial surface of said wheel, said axial surface having a first portion and a second portion complementary with said first portion, said overlay comprising:

a metal plated panel member having an outboard surface and an inboard surface oppositely disposed from said outboard surface, said inboard surface having a first portion and a second portion, said first portion of said inboard surface of said metal plated panel member being configured to mate with said first portion of said axial surface of said wheel upon assembling said metal plated panel member to said wheel, such that said first portion of said inboard surface is juxtaposed said first portion of said axial surface;

said second portion of said inboard surface of said metal plated panel member being configured to be spaced apart from said second portion of said axial surface of said wheel upon assembling said metal plated panel member to said wheel, such that said second portion of said inboard surface and said second portion of said axial surface define a void therebetween; and a spacing member portion projecting from said inboard surface of said metal plated panel member, said spacing member portion having one side integrally formed with said second portion of said inboard surface of said metal plated panel member to define a radially disposed spacing member or portion contiguous said second portion of said inboard surface of said metal plated panel member, said spacing member portion being configured to mate with said second portion of said axial surface of said disk portion of said wheel and thereby substantially fill said void;

whereby said metal plated panel member is a unitary member which is mounted as a discrete unit to said wheel such that said first portion of said inboard surface of said overlay is juxtaposed said first portion of said axial surface of said wheel, and such that on assembly of said metal plated panel member to said wheel said spacing member portion projecting from said second portion of said inboard surface of said metal plated panel member is intermediate said second portion of said inboard surface of said metal plated panel member and said second portion of said axial surface of said disk portion of said wheel to substantially fill said void so as to prevent moisture and/or dirt from becoming trapped within said void between said metal plated panel member and said wheel.

49. The overlay and wheel assembly of claim 48 wherein said metal plated panel member is a metal plated plastic panel member.

* * * * *

UNITED STATES PATENT AND TRADEMARK OFFICE
CERTIFICATE OF CORRECTION

PATENT NO. : 5,630,654
DATED : May 20, 1997
INVENTOR(S) : Lee A. Chase

It is certified that error appears in the above-identified patent and that said Letters Patent is hereby corrected as shown below:

Column 1, line 35, kindly delete "begins:" and insert ---- begins ----.

Column 3, line 42, kindly delete "thee" and insert ---- the ----.

Column 7, line 6, kindly delete "resistance" and insert ---- resistant ----.

Column 12, line 6, kindly delete the comma "," after "panel".

Column 12, lines 35 and 36, kindly delete "as claimed in" and insert ---- of ----.

Column 12, line 39, after "The" kindly insert ---- composite ----.

Column 13, line 26, kindly delete "feature".

Column 13, line 32, after "of" kindly insert ---- said ----.

Column 13, line 57, kindly delete "surfacer" and insert ---- surface, ----.

Signed and Sealed this

Twenty-third Day of March, 1999

Attest:

Q. TODD DICKINSON

*Attesting Officer*       *Acting Commissioner of Patents and Trademarks*